United States Patent [19]

Moorehead

[11] Patent Number: 4,844,791

[45] Date of Patent: * Jul. 4, 1989

[54] HYDROPROCESSING WITH A CATALYST CONTAINING NON-HYDROLYZABLE HALOGEN

[75] Inventor: Eric L. Moorehead, Diamond Bar, Calif.

[73] Assignee: Union Oil Company of California, Los Angeles, Calif.

[ * ] Notice: The portion of the term of this patent subsequent to Jun. 13, 2006 has been disclaimed.

[21] Appl. No.: 919,192

[22] Filed: Oct. 15, 1986

Related U.S. Application Data

[62] Division of Ser. No. 638,866, Aug. 7, 1984, abandoned.

[51] Int. Cl.$^4$ .................. C10G 45/12; C10G 47/16
[52] U.S. Cl. .................... 208/111; 208/112; 208/115; 208/216 R; 208/217; 208/251 H; 208/254 H
[58] Field of Search ............ 208/213, 251 H, 241, 208/111, 112, 115, 216 R, 217, 254 H; 502/228, 229, 231

[56] References Cited

U.S. PATENT DOCUMENTS

| | | | |
|---|---|---|---|
| 2,677,648 | 5/1954 | Lien et al. | 208/241 |
| 3,477,965 | 11/1969 | Fishel | 252/422 |
| 3,528,909 | 9/1970 | White | 208/251 H |
| 3,630,965 | 12/1971 | Voorhies, Jr. et al. | 252/442 |
| 3,702,312 | 11/1972 | Wilson et al. | 252/442 |
| 4,036,739 | 7/1977 | Ward | 208/120 |
| 4,285,807 | 8/1981 | Stanulones et al. | 208/251 H |
| 4,297,335 | 10/1981 | Lok et al. | 423/328 |
| 4,306,964 | 12/1981 | Angevine | 208/251 H |
| 4,328,128 | 5/1982 | Stanulones et al. | 208/251 H |
| 4,401,556 | 8/1983 | Bezman et al. | 208/111 |
| 4,427,786 | 1/1984 | Miale et al. | 502/61 |
| 4,427,787 | 1/1984 | Miale et al. | 502/71 |
| 4,427,788 | 1/1984 | Miale et al. | 502/71 |
| 4,427,789 | 1/1984 | Miale et al. | 502/71 |
| 4,427,790 | 1/1984 | Miale et al. | 502/71 |
| 4,427,791 | 1/1984 | Miale et al. | 502/203 |
| 4,431,516 | 2/1984 | Baird et al. | 208/111 |
| 4,431,517 | 2/1984 | Nevitt et al. | 208/111 |
| 4,431,527 | 2/1984 | Miller et al. | 208/254 |
| 4,443,329 | 4/1984 | Eberly, Jr. et al. | 208/111 |
| 4,444,738 | 4/1984 | Suzuki et al. | 423/329 |
| 4,483,764 | 11/1984 | Hensley, Jr. et al. | 208/251 H |
| 4,501,655 | 2/1985 | Hilfman et al. | 258/115 |
| 4,569,833 | 2/1986 | Gortsema et al. | 502/85 |
| 4,582,592 | 4/1986 | Masada et al. | 208/213 |
| 4,604,189 | 8/1986 | Derbyshire et al. | 208/251 H |
| 4,684,511 | 8/1987 | Gortsema et al. | 502/77 |

*Primary Examiner*—Anthony McFarlane
*Attorney, Agent, or Firm*—Alan H. Thompson; Gregory F. Wirzbicki

[57] ABSTRACT

A catalyst containing a non-hydrolyzable halogen component is employed to hydroprocess a hydrocarbon oil.

20 Claims, No Drawings

HYDROPROCESSING WITH A CATALYST CONTAINING NON-HYDROLYZABLE HALOGEN

This application is a division, of application Ser. No. 638,866, filed Aug. 7, 1984, now abandoned.

BACKGROUND OF THE INVENTION

1. Field of the Invention

The invention relates to catalysis, and particularly to hydrocarbon hydroprocessing catalysts, such as those utilized to catalyze the reaction of hydrogen with organo-sulfur, organo-nitrogen, organo-metallic, and asphaltene compounds. More particularly this invention is directed to a process for hydrodesulfurizing and hydrodenitrogenating heavy hydrocarbon liquids.

2. Description of the Prior Art

In the refining of hydrocarbon oils, it is often desirable to subject the hydrocarbon oil to catalytic hydroprocessing. During hydroprocessing, particulate catalysts are utilized to promote reactions such as desulfurization, denitrogenation, demetallization and/or conversion of asphaltene compounds. This is accomplished by contacting the particulate catalyst with a feedstock, such as a residual petroleum oil fraction, under conditions of elevated temperature and pressure and in the presence of hydrogen so that the sulfur components are converted to hydrogen sulfide, nitrogen components to ammonia, asphaltenes to molecules having increased hydrogen to carbon (H/C) ratios and contaminant metal components to components capable of being deposited on the catalyst. Typically, hydroprocessing is employed to reduce the concentration of nitrogen and sulfur in feedstocks so as to produce hydrocarbons which, when eventually combusted, result in reduced air pollutants of the forms $NO_x$ and $SO_x$. Reducing the concentration of nitrogen and metals is also desirable to protect other refining catalysts, such as hydrocracking catalysts, which deactivate in the presence of nitrogen and contaminant metals.

A typical hydroprocessing catalyst contains hydrogenation metals on a porous refractory oxide support. Hydrogenation metals usually include Group VIB and/or Group VIII active metal components supported on amorphous refractory oxide supports such as alumina. Also, "acidifying" agents, such as phosphorus components, are commonly impregnated onto the catalyst to improve its activity by increasing its acidity. Other means of increasing the acidity of the catalyst have included incorporating zeolite materials into the amorphous refractory oxide support.

Despite the high hydroprocessing activity of the catalysts of the prior art, catalysts of yet higher activities are still being sought. The higher the activity of the catalyst, the lower the reactor temperature required to obtain a product of given nitrogen, sulfur, asphaltene, or metal content from the feedstock. The lower the reaction temperature, the lower the expense of hydroprocessing a given unit of feedstock due to the savings in process heat requirements.

A common problem with hydroprocessing catalysts containing acidifying components is the hydrolysis of such components either prior to or during processing of the hydrocarbon. Hydrolysis results in the loss of the acidifying component from the catalyst and consequently the catalyst activity is decreased. Also, as the lost acidic materials from the catalyst pass downstream, the refinery metallurgy may be attacked and damaged by corrosion.

Accordingly, it is a major object of this invention to provide a hydroprocessing catalyst having non-hydrolyzable acidifying components, and more particularly to provide a catalyst containing a non-hydrolyzable acidifying component.

Another object of the invention is to provide a method for hydroprocessing a hydrocarbon feedstock with a particulate catalyst containing a non-hydrolyzable acidifying component.

It is a further object of the invention to provide a catalytic hydroprocessing method for a hydrocarbon residuum feedstock wherein the catalyst contains a support matrix having amorphous refractory oxides interspersed with non-hydrolyzable acidifying components.

Another object of the invention is to provide a process for removing organo-nitrogen and/or organo-sulfur compounds from a residuum hydrocarbon oil by contacting the oil with a catalyst having non-hydrolyzable acidifying components.

These and other objects and advantages of the invention will become apparent from the following description.

SUMMARY OF THE INVENTION

The invention relates to a catalyst containing at least one non-hydrolyzable halogen component and a method for hydroprocessing a hydrocarbon oil with such a catalyst. The catalyst contains at least one active metal component on a support material containing at least one non-hydrolyzable halogen component. In one embodiment, the catalyst is prepared with a catalytic component, such as a zeolite, that is first contacted with a gaseous mixture containing at least one halogen gas and thereafter incorporated with an amorphous support matrix, preferably containing a refractory oxide. In another embodiment, a residuum hydrocarbon oil is hydroprocessed by contact under reaction conditions with a catalyst containing at least one non-hydrolyzable fluorine component. In a third embodiment, a hydrocarbon oil is denitrogenated by contact under denitrogenation conditions with a catalyst containing a zeolite having at least one non-hydrolyzable fluorine component.

DETAILED DESCRIPTION OF THE INVENTION

The invention is directed to a hydroprocessing catalyst comprising active metals on a support material containing a non-hydrolyzable halogenated catalytic component. For hydrodesulfurization purposes, the catalyst preferably comprises Group VIII and VIB active metal components on a support material comprising at least one non-hydrolyzable halogenated catalytic component, such as a fluorinated zeolite, interspersed with an amorphous refractory oxide material having an average pore diameter between about 50 and about 300 angstroms, as determined by conventional mercury porosimeter methods, which neglect pores of diameter below about 40 Angstroms when the maximum pressure is 50,000 p.s.i.a. (Usually the catalyst of the invention will contain part of the pore volume in pores of diameter less than 40 Angstroms, due to the presence of small-pore catalytic components, such as zeolites and molecular sieves. However, in determining physical characteristics of the catalyst herein, pore volume in pores less than 40 Angstroms is neglected.) The catalyst of the invention is particularly well suited for hydrodesulfurization wherein the desired result is desulfurization coupled with a high degree of hydrodenitrogenation of a hydrocarbon oil containing a high content of asphaltenes, nitrogen and sulfur.

As defined herein, a catalyst containing a "non-hydrolyzable" halogen component contains the halogen in a form such that not more than 20 weight percent thereof is lost after being subjected to a gas stream containing 15 volume percent of steam and the balance nitrogen for 15 hours at 400° C. A test for determining whether the halogen component is non-hydrolyzable is as follows: (1) into a quartz tube with glass wool plugs is placed 100 grams of a halogenated catalyst having a determined weight percent of halogen and connected to the tube is a source of steam diluted to 15 volume percent in a nitrogen gas carrier, (2) the tube is placed in a tube furnace at ambient (room) temperature, i.e. 25° C., and heated at 50° C./hour to 400° C. while the steam/nitrogen gas flow is maintained at 10 scf/hour, (3) the steam/nitrogen gas flow and the tube is maintained at 400° C. for 15 hours and then the steam is suspended and the catalyst cooled to room temperature in a nitrogen atmosphere, (4) the remaining weight percent of the halogen in the treated halogenated catalyst sample is determined by conventional methods, such as potentiometric measurements utilizing specific halogen-sensitive electrodes (i.e., for example, chlorine-sensitive electrode for chlorine detection and fluorine-sensitive electrode for fluorine detection) and, (5) the weight percent of the halogen in the catalyst starting material in step (1) is compared with that in the treated material in step (4). Such a test can readily determine whether less than 20 weight percent of the halogen, on a dry weight basis, is lost from the halogenated catalyst sample during steam treatment.

The catalyst of the invention contains at least one active metal component on a support material containing at least one non-hydrolyzable halogen component. The halogen component usually selected for use in the invention is chosen from the group consisting of fluorine and chlorine, with fluorine the more highly preferred. Typically, the catalyst contains about 0.01 to about 10, and preferably about 0.1 to about 5 weight percent of the halogen component, calculated as the monoatomic element.

The support material typically contains a catalytic component containing the non-hydrolyzable halogen component. Catalytic components useful in the present hydroprocessing catalysts are natural and synthetically prepared crystalline or amorphous aluminosilicates, including zeolites, molecular sieves and inorganic refractory oxides. Such components include, but are not limited to, amorphous, coprecipitated silica-aluminas, erionite, mordenite, zeolite omega, zeolite beta, zeolite Y, ZSM-5, ZSM-11, ZSM-12, ZSM-35, zeolite L and silicalite. However, the preferred catalytic components are crystalline zeolites, especially zeolite X and zeolite Y, and their stabilized derivatives. A highly preferred catalytic component, a modified zeolite Y, disclosed in U.S. Pat. No. 4,036,739, is incorporated by reference herein in its entirety. A most highly preferred catalytic component is a modified zeolite Y, disclosed in samples A through F, of Table II, in U.S. Pat. No. 4,297,335, issued to Lok et al., which is herein incorporated by reference in its entirety.

Ordinarily, a crystalline zeolitic aluminosilicate having a $SiO_2/Al_2O_3$ molar ratio of at least 2, preferably in the range from about 2 to about 100 is preferred, especially those zeolites having at least 50, and preferably, at least 90 percent of the framework aluminum atoms not associated with metal ions.

A catalyst containing a non-hydrolyzable halogen component frequently exhibits high hydrophobicity and essentially no halogen loss during hydroprocessing of a hydrocarbon oil. A preferred method for preparing such a catalyst is to contact a catalytic component, such as a zeolite active for catalytic cracking reactions, with an elemental halogen-containing gas, preferably a gas mixture comprising a halogen (preferably elemental fluorine), an inert gas (preferably nitrogen), and optionally oxygen. Ordinarily, the gas mixture contains at least about 0.05 volume percent, and preferably about 0.1 to about 20 volume percent of elemental halogen, up to about 21 volume percent of oxygen and the remainder one or a mixture of inert gases, preferably nitrogen. The catalytic component is typically contacted with the halogen at a temperature above about 50° F. for at least 1 minute and the resulting halogenated material can be further treated by calcination at temperatures up to the destruction temperature of the catalytic component. The resulting halogenated catalytic component has enhanced hydrophobicity properties, and the halogen is essentially non-hydrolyzable. It is highly preferred that a halogenated zeolite be prepared in the same or similar manner as the halogenated zeolite prepared in accordance with the disclosure in U.S. Pat. No. 4,297,335 issued to Lok et al.

Preferably, the zeolite or other catalytic component containing non-hydrolyzable halogen components is dispersed by admixture into a support matrix material, typically non-zeolitic amorphous refractory oxides, to form a support material suitable for use in the catalyst of the invention. The support material typically comprises about 5 to about 95 weight percent, preferably about 10 to about 90 weight percent, and most preferably about 15 to about 85 weight percent of the halogenated zeolite or other halogenated catalytic component. In a most highly preferred embodiment, about 15 to about 50 weight percent of the admixture comprises a halogenated catalytic component.

The amorphous matrix portion of the support material usually contains essentially no hydrolyzable halogen component. Typical support matrix compositions are selected from amorphous refractory oxides such as silica, magnesia, silica-magnesia, zirconia, silica-zirconia, titania, silica-titania, etc. Mixtures of the foregoing oxides are also contemplated, especially when prepared as homogeneously as possible. The preferred refractory oxide material, however, comprises aluminum and is usually selected from the group consisting of alumina, lithium-alumina, phosphorus-alumina, lithium-phosphorus-alumina, and silica-alumina. When employed in the preparation of catalysts promoting hydrocarbon conversion processes such as hydrodesulfurization, hydrodenitrogenation, hydrodemetallization and hydroconversion of asphaltenes, transition aluminas such as gamma alumina, eta alumina, delta alumina and theta alumina are highly preferred refractory oxides. It is most highly preferred that the amorphous refractory oxide contain at least about 90, and even more preferably at least about 95 weight percent of alumina, with gamma alumina and eta alumina being most preferred.

Physical characteristics of the amorphous matrix portion of the support particles typically include a pore size distribution wherein the average pore diameter is usually greater than 50 angstroms and ordinarily in the range from about 50 to about 300 angstroms. Also, the present supports preferably have at least 50 percent of their support matrix pore volume in pores of diameter within about 40, typically 35, and preferably 30, angstroms above or below the average pore diameter.

In one preferred embodiment in which the support material is used to prepare a catalyst effective for hydrocarbon demetallation, desulfurization, denitrogenation and conversion of asphaltenes, the amorphous matrix portion of the support is alumina having an average pore diameter from about 110 to about 220 angstroms and a narrow pore size distribution wherein at least about 50 percent, and preferably at least about 55 percent of the pore volume, is in pores of diameter distributed over a narrow range of about 60 angstroms within the 110 angstrom range of about 110 to about 220 angstroms. In another preferred embodiment for hydrodesulfurization, hydrodenitrogenation, etc., the alumina matrix has an average pore diameter from about 50 to about 110 angstroms, and preferably about 60 to about 90 angstroms. In this embodiment, the support has a narrow pore size distribution wherein at least about 50 percent, and preferably at least about 60 percent of the pore volume is in pores distributed over a narrow range of about 20 angstroms above to about 20 angstroms below the average pore diameter. The amorphous matrix portion of the support particles having the preferred physical characteristics disclosed herein are commercially available from Nippon-Ketjen Catalyst Division of AKZO-Chemie, and American Cyanamid, Inc.

Representative examples of amorphous matrix supports and their physical characteristics are disclosed in the following Table A:

amorphous matrix portion of the support particles may have, for example, at least 55 percent of their pore volume in pores of 140 to 220 angstrom diameter and yet still, despite subsequent impregnations, calcinations, and other catalyst preparational steps, yield a final catalyst also having at least 55 percent of the pore volume of the amorphous matrix in that range. Such a catalyst also contains at least about 50 percent of the pore volume in pores of diameter in the range from about 30 angstroms above to about 30 angstroms below an average pore diameter in the range of about 160 to 180 angstroms.

The catalytic component/amorphous matrix support material is usually prepared in the form of shaped particulates by methods well known in the art, with the preferred method being to extrude a precursor of the desired support, as for example, an amorphous inorganic refractory oxide gel such as a spray-dried or peptized alumina gel interspersed with a zeolitic material containing a non-hydrolyzable halogen component, through a die having openings therein of desired size and shape, after which the extruded matter is cut into extrudates of desired length. The catalytic component/amorphous matrix support particles may also be prepared by mulling (or pulverizing), for example a precalcined amorphous refractory oxide, having a predetermined pore size distribution, to a particle size less than about 100 microns and then admixing therewith a halogenated zeolite prepared as disclosed herein. If the amorphous matrix support is not capable of sufficiently binding with the catalytic component, a suitable binder, such as Catapal TM alumina, may be employed prior to extrusion. The extruded particles usually have a symmetrical cross-sectional shape, preferably a cylindrical shape or has protrusions (lobes) from central area, such

TABLE A

| Pore Diameter Antstroms | Commercial[a] Denitrogenation Catalyst Support % Pore Volume | Commercial[a] Demetallation Catalyst Sup. % Pore Volume | Commercial De-[b] nitrogenation Catalyst Support % Pore Volume |
|---|---|---|---|
| <40 | 0 | 0 | 0 |
| 40–50 | 0 | 0 | 4 |
| 50–60 | 4 | 0 | 16 |
| 60–70 | 15 | 0 | 46 |
| 70–80 | 61 | 0 | 28 |
| 80–90 | 13 | 0 | |
| 90–100 | | 0 | |
| 100–110 | | 1 | |
| 110–120 | | 2 | |
| 120–130 | | 1 | |
| 130–140 | | 5 | |
| 140–150 | | 8 | |
| 150–160 | 7 | 6 | 6 |
| 160–170 | | 16 | |
| 170–180 | | 22 | |
| 180–190 | | 15 | |
| 190–200 | | 8 | |
| 200–210 | | 4 | |
| 210–220 | | 2 | |
| >220 | | 10 | |
| PORE VOLUME cc/gram (Merc. Poros.) | 0.63 | 0.84 | 0.58 |
| AVERAGE PORE DIAMETER (Merc. Poros.) | ~76 | ~175 | ~67 |

[a] available from Nippon-Ketjen
[b] available from American Cyanamid

In the preparation of the catalysts of the present invention, the pore size distribution of the amorphous matrix portion of the support particles may be similar to that of the final catalyst, but such is not necessary or critical. As will be shown hereinafter in Example I, the as polylobes. The cross-sectional diameter of the particles is usually about 1/40 to about ⅛ inch, preferably about 1/32 to about 1/12 inch, and most preferably about 1/24 to about 1/15 inch. Among the preferred catalyst configurations, at least for hydroprocessing, are those having cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. More preferred particulates are those having quadralobal cross-sectional shapes, as in FIG. 10 of U.S. Pat. No. 4,028,227, and most preferably, when the lobes are asymmetrical.

Support particles prepared by the foregoing or equivalent procedures are generally precalcined, especially if gamma alumina is a chosen support matrix material. Temperatures above about 900° F. are usually required to convert alumina gel or hydrated alumina particulates to gamma alumina or other forms of alumina. Typically, utilized to effect this transformation, with holding periods of $\frac{1}{4}$ to 3 hours generally being effective.

Characteristics of the preferred catalytic component/amorphous matrix dispersed supports utilized herein include a total pore volume, average pore diameter and surface area large enough to provide substantial space and area to deposit the active metal components. The total pore volume of the support, as measured by conventional mercury porosimeter methods, is usually about 0.2 to about 2.0 cc/gram, preferably about 0.4 to about 1.5 cc/gram, and most preferably about 0.5 to about 0.9 cc/gram. The average pore diameter of the support is usually greater than about 50 angstroms, and ordinarily in the range from about 50 to about 300 angstroms. Preferably, at least 50 percent of the total pore volume of the support is in pores in the range from about 30 angstroms above to about 30 angstroms below the average pore diameter. Additionally, the surface area (as measured by the B.E.T. method) of the support particles is above about 100 $m^2$/gram, usually from about 100 $m^2$/gram to about 300 $m^2$/gram, and preferably about 125 $m^2$/gram to about 275 $m^2$/gram.

To prepare the hydroprocessing catalyst, the support material is compounded, as by impregnation of the calcined catalytic component/amorphous matrix support particles, with one or more precursors of at least one catalytically active metal component. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method, the preferred method, is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination, as for example at temperatures between 900° F. and 1400° F., converts the metals to their respective oxide forms. In some cases, calcinations may follow each impregnation of individual active metals. Such multiple impregnation-calcination procedures, however, may be avoided in alternative embodiments of the invention, as for example, by comulling all the active metals with the support materials rather than impregnating the metals thereon. In comulling, the precursors of the support materials, usually a mixture including the halogenated catalytic component and the amorphous matrix in a hydrated or gel form, is admixed with precursors of the active metal components, either in solid form or in solution, to produce a paste suitable for shaping by known methods, e.g., pelleting, extrusion, etc. A single, subsequent calcination yields a hydroprocessing catalyst containing the active metals in their respective oxide forms.

When the hydroprocessing catalyst is prepared by the foregoing or equivalent methods, at least one active metal component is selected, typically from the Group VIB and VIII metals of the Periodic Table of Elements. Preferably, the catalyst contains both a Group VIB and VIII element as hydrogenation metals, with cobalt or nickel and molybdenum or tungsten being the most preferred combination of active metals. The hydroprocessing catalyst contains up to about 10, usually from 1 to 8 percent, and preferably from 2 to 6 percent by weight of the Group VIII metal, calculated as the monoxide, and up to about 30, usually from about 3 to about 28 percent, and preferably from 8 to 26 percent by weight of the Group VIB metal, calculated as the trioxide.

In accordance with the invention, a hydroprocessing catalyst is prepared so as to have a narrow pore size distribution wherein at least 50, and preferably at least 60 percent of the pores are of diameter in the range from about 30 angstroms above and about 30 angstroms below the average pore diameter, as measured by mercury porosimetry. The average pore diameter of the catalyst is typically greater than about 50 angstroms and usually in the range from about 50 to about 300 angstroms. It is highly preferred that at least 50 percent of the pore volume be in pores of diameter from about 20 angstroms above to about 20 angstroms below the average pore diameter. Other physical properties of the catalyst typically include a total pore volume of less than about 1.2 cc/gram and a surface area greater than about 100 $m^2$/gram, with both properties determined by the conventional methods previously disclosed herein.

A highly preferred catalyst of the invention contains about 5 to about 16 weight percent of Group VIB metal components, calculated as the trioxide, and from about 0.5 to about 6 weight percent of Group VIII metal components, calculated as the monoxide, on a support having a zeolite such as the zeolites disclosed in U.S. Pat. Nos. 4,036,739 and 4,297,335, containing a non-hydrolyzable halogen component interspersed with a refractory oxide containing gamma alumina. The most preferred Group VIII and Group VIB metals in this embodiment are cobalt or nickel and molybdenum or tungsten, respectively. Physical characteristics of this catalyst include a total pore volume of about 0.3 to about 0.8 cc/gram, a surface area from about 100 to about 300 $m^2$/gram and an average pore diameter from about 140 to about 210 angstroms.

Another highly preferred catalyst of the invention contains about 2 to about 6 weight percent of Group VIII metal components, calculated as the monoxide, and from about 16 to about 26 weight percent of Group VIB metal components, calculated as the trioxide, on a support containing a zeolite, such as the zeolites disclosed in U.S. Pat. Nos. 4,036,739 and 4,297,335, having a non-hydrolyzable halogen component interspersed with an amorphous refractory oxide containing gamma alumina. Most preferably, the Group VIII metal is cobalt or nickel and the Group VIB metal is molybdenum or tungsten. Physical properties of the catalyst include a total pore volume of about 0.3 to about 0.7 cc/gram, a surface area between about 110 and 250 m²/gram and an average pore diameter from about 60 to about 90 angstroms.

Catalysts are activated in accordance with methods suited to the process in which it will be used. As an illustration, most hydroprocessing catalysts are more active, sometimes even far more active, in a sulfided form than in the oxide form in which they are generally prepared. Accordingly, hydroprocessing catalysts prepared in accordance with the invention may be sulfided prior to use (in which case the procedure is termed "presulfiding") by passing a sulfiding agent over the catalyst prepared in the calcined form. Temperatures between 300° F. and 700° F. and space velocities between about 140 and 500 v/v/hr are generally employed, and this treatment is usually continued for about two hours. A mixture of hydrogen and one or more components selected from the group consisting of sulfur vapor and the sulfur compounds (e.g., lower molecular weight thiols, organic sulfides, and especially $H_2S$) is suitable for presulfiding. Generally speaking, the relative proportion of hydrogen in the presulfiding mixture is not critical, with any proportion of hydrogen ranging between 1 and 99 percent by volume being adequate.

If catalyst is to be used in a sulfided form, it is preferred that a presulfiding procedure be employed. However, since many hydroprocessing catalysts are used to upgrade sulfur-containing hydrocarbons, as in hydrodesulfurization, one may, as an alternative, accomplish the sulfiding in situ, particularly with hydrocarbon oils containing about 1.0 weight percent or more of sulfur under conditions of elevated temperature and pressure.

Water is typically produced during the sulfiding (presulfiding or in situ) of oxygen-containing calcined catalysts. An advantage of the catalyst and process of the invention is that the halogen component contained in the catalytic component of the catalyst support undergoes essentially no hydrolysis upon contact with such water, during presulfiding or during hydroprocessing. Additionally, the halogenated catalytic component is not hydrolyzed by ammonia or other typical reactants and products involved in the hydroprocessing of the hydrocarbon feedstock. The lack of susceptibility of the catalyst to hydrolysis of the halogen component in the catalytic component effects essentially no significant loss of the halogen component from the catalyst. Since such little, if any, halogen is lost from the catalyst, any lost halogen causes minor damage to refinery metallurgy, such as the reactor unit or downstream refining equipment.

After a hydroprocessing catalyst of desired chemical and physical characteristics is prepared, it is usually employed as either a fixed, slurried or fluidized bed of particulates in a suitable reactor vessel wherein a hydrocarbon feedstock to be treated is introduced and subjected to elevated conditions of pressure and temperature, and a substantial hydrogen partial pressure, so as to effect the desired degree of hydroprocessing, for example, desulfurization, denitrogenation, demetallization and conversion of asphaltenes. Most usually, the catalyst is maintained as a fixed bed with the feedstock passing downwardly therethrough, and the reactor is generally operated under conditions selected from those shown in the following Table I:

TABLE I

| Operating Conditions | Suitable Range | Preferred Range |
|---|---|---|
| Temperature, °F. | 500–900 | 600–850 |
| Hydrogen Pressure, p.s.i.g. | 500–3000 | 1000–2500 |
| Space Velocity, LHSV | 0.05–3.0 | 0.1–1.5 |
| Hydrogen Recycle Rate, scf/bbl | 5000–15000 | 2000–10000 |

Contemplated for treatment by the process employing the catalyst of the invention are hydrocarbon-containing oils, herein referred to generally as "oils," including broadly all liquid and liquid/vapor hydrocarbon mixtures such as crude petroleum oils and synthetic crudes. Among the typical oils contemplated are top crudes, vacuum and atmospheric residual fractions, heavy vacuum distillate oils, shale oils, oils from bituminous sands, coal compositions and the like.

Although virtually any hydrocarbon feedstock containing undesirable proportions of sulfur and nitrogen may be treated by hydroprocessing, the catalyst of the invention is particularly suited to treating asphaltene-containing atmospheric or vacuum residuum, especially when sulfur is present therein in a proportion exceeding 0.1 weight percent and even more especially exceeding 1.0 weight percent. Frequently, the feedstock contains undesirable proportions of nitrogen, usually in a concentration greater than about 0.01 weight percent and often between about 0.2 and 1.0 weight percent.

The typical residuum oil for treatment herein is high boiling wherein at least 95 percent of its constituents boil above about 600° F. Ordinarily, at least about 5 weight percent of the residuum consituents boil above about 1000° F. and/or at least about 0.1, and preferably at least about 1.0 weight percent of asphaltenes are contained in the oil. The bulk of the metallic contaminants contained in most residua is contained in the asphaltenes, in large part as complex metal porphyrins, with the typical metallic contaminants found in residua comprising one or more of vanadium, nickel, iron, sodium, potassium, zinc, copper, antermony and arsenic. Thus metals are usually present in the feedstocks contemplated for treatment herein such that the concentration of vanadium plus nickel, calculated as the metals, is above about 30 ppmw, usually between about 50 and 500 ppmw. Also, such sulfur, nitrogen, asphaltene and metals-containing oils commonly have an API gravity less than about 30°, usually less than about 25°, and often less than about 20°.

The results obtained in any particular hydroprocess will depend upon the nature of the catalyst, the nature of the feedstock, and the severity of the operating conditions. The more contaminated the feedstock is with sulfur, nitrogen, asphaltene and metal components, the more severe the conditions will have to be to achieve given results. In addition, the operating conditions are very much dependent upon the catalyst, for the nature of the catalyst plays a vital role in achieving intended results. If high demetallization is desired, then acceptable results will be difficult to achieve with a catalyst containing an amorphous matrix containing a relatively small pore amorphous refractory oxide even under severe conditions. On the other hand, a catalyst having a amorphous matrix containing a large-pore amorphous refractory oxide support has an advantage in that, because large metal-containing molecules can only reach the surface of small-pore catalysts with difficulty, such catalysts tend to last much longer before fouling occurs.

If what is desired is high desulfurization, denitrogenation and long life with some sacrifice of demetallization, then a catalyst having a relatively small pore amorphous refractory oxide support will provide an advantage in this regard.

The invention is further illustrated by the following examples which are illustrative of specific modes of practicing the invention and are not intended as limiting the scope of the invention defined by the appended claims.

EXAMPLE I

A catalyst, designated as Catalyst AF, is prepared in accordance with the invention.

Catalyst AF is prepared as follows: 217 grams of alumina support particles having the physical characteristics summarized in Table II below are mulled (ground) for 20 minutes and peptized with 75 ml of a 3.3 weight percent nitric acid ($HNO_3$) solution for 15 minutes. A dry fluorinated Type-Y zeolite (68.4 grams) is then added to the peptized alumina and mulling is continued for 20 minutes. The fluorinated Type-Y zeolite is prepared in a similar manner as Sample D in Table II of the aforementioned Lok et al. patent, and contains about 0.25 weight percent of fluorine, calculated as F.

About 86 ml of water are mixed with the alumina-fluorinated zeolite mixture for 30 minutes to form an extrudable paste. The paste is extruded through a die producing 1/16 inch cross-sectioned trilobal extruded matter, which, after being broken into extrudates of about 0.1 and 0.6 inch lengths, is oven dried at 110° C. for 2 hours and calcined at 1200° F. for 2 hours. The calcined alumina-fluorinated zeolite support particle extrudates contain the zeolite to alumina in a 1 to 4 weight ratio and have the physical characteristics summarized in Table II.

The alumina-fluorinated zeolite support particles are impregnated with 75 ml of an impregnant solution containing 33.5 grams of ammonium heptamolybdate [$(NH_4)_6Mo_7O_{24}\cdot 4H_2O$] and 35.4 grams of cobalt nitrate [$Co(NO_3)_2\cdot 6H_2O$]. After impregnation, the catalyst is dried at 110° C. and calcined at 1025° F. for 2 hours in flowing air. A final catalyst is produced having a nominal composition as follows: 12.0 weight percent of molybdenum components, calculated as $MoO_3$, 4.0 weight percent of cobalt components, calculated as CoO, with the balance comprising the alumina-fluorinated zeolite support. The physical characteristics of the finished catalyst are summarized below in Table II.

TABLE II

| | PHYSICAL CHARACTERISTICS | | |
|---|---|---|---|
| Pore Diameter,** Angstroms | Alumina* Support % of Pore Volume | Catalyst AF and Ref. Catalyst AM % of Pore Volume | Reference Catalyst A % of Pore Volume |
| <140 | <20 | <20 | <20 |
| 140–220 | >55 | >55 | >55 |
| >300 | <20 | <20 | <20 |
| 220–300 | remainder | remainder | remainder |
| ±30 from AVERAGE PORE DIAMETER (APD) | >50 | >50 | >50 |
| APD | ~165 | ~175 | ~180 |
| PORE VOLUME, cc/gram | 0.8 | 0.4 | 0.7 |
| SURFACE AREA $m^2$/gram | 153 | 240 | 140 |

TABLE II-continued

| | PHYSICAL CHARACTERISTICS | | |
|---|---|---|---|
| Pore Diameter,** Angstroms (B.E.T.) | Alumina* Support % of Pore Volume | Catalyst AF and Ref. Catalyst AM % of Pore Volume | Reference Catalyst A % of Pore Volume |

*Available from Nippon-Ketjen
**All pore sizes determined by mercury porosimetry

EXAMPLE II

Catalyst AF of Example I, prepared in accordance with the invention, is tested to determine its denitrogenation and desulfurization activity against two reference catalysts.

Reference catalyst AM is prepared in a similar manner as catalyst AF in Example I, except the zeolite material contains no fluorine or other halogen component. Catalyst AM has essentially the same metals loading (12.0 weight percent of molybdenum components, calculated as $MoO_3$, 4.0 weight percent of cobalt components, calculated as CoO) and physical characteristics (including alumina/zeolite weight ratio and pore size distribution, surface area and pore volume) as catalyst AF.

Reference catalyst A is a commercially available catalyst prepared in a similar manner as catalyst AF in Example I, except no zeolite is interspersed with the alumina. Catalyst A has essentially the same metals loading as catalyst AF but contains no halogens. The physical characteristics of reference catalyst A are summarized in Table II in Example I.

Catalyst AF and the two reference catalysts are each presulfided for about 16 to about 20 hours by contact with a gas consisting of 90 volume percent $H_2$ and 10 volume percent $H_2S$ flowing at 4.4 SCFH at one atmosphere pressure. The temperature during the presulfiding is initially at room temperature, is increased gradually until 700° F. is reached, and then lowered to 550° F., at which time the catalyst is contacted with the feedstock.

Catalyst AF and reference catalysts AM and A are tested to determine their hydrodenitrogenation and hydrodesulfurization activities with a Heavy Arabian atmospheric residuum feedstock having the characteristics shown in Table III below. The presulfided catalysts, AF and the references, are each charged in separate runs to a reactor and utilized at 720° F. for 13 days and at 740° F. for the next 5 days to hydrodesulfurize and hydrodenitrogenate the atmospheric residua feedstock under the following conditions: 2,200 p.s.i.g. total pressure, 0.8 LHSV, a mass velocity of 220 lbs/hr $ft^2$ and a hydrogen rate of 4,500 SCF/B.

TABLE III

| Feedstock Properties | |
|---|---|
| Feed Description | Heavy Arabian Atmospheric Residua |
| Gravity, °API | 12.5 |
| Sulfur, wt. % | 3.84 |
| Nitrogen, wt. % | 0.323 |
| Vanadium, ppmw | 94 |
| Nickel, ppmw | 30 |
| Ash, ppmw | 0.02 |
| Carbon Residue, D-189, wt. % | 12.9 |
| Asphaltenes, (UTM-86), wt. % | 12.8 |
| Pour Point, °F. | +15 |
| ASTM D-1160 Distillation, °F. | |

TABLE III-continued

| Feedstock Properties | |
|---|---|
| Feed Description | Heavy Arabian Atmospheric Residua |
| IBP | 642 |
| 5 | 726 |
| 10 | 767 |
| 20 | 837 |
| 30 | 898 |
| 40 | 960 |
| 50 | 1039 |
| End Point | 1070 |

A portion of the feedstock is passed downwardly through each reactor and contacted with the described catalysts in a single stage, single pass system with once-through hydrogen. The data relating to conversion of nitrogen and sulfur compounds is summarized in Tables IV and V, respectively.

TABLE IV

| | Percent Nitrogen Conversion | | | | |
|---|---|---|---|---|---|
| Catalysts | 5 Days | 10 Days | 13 Days | 15 Days | 18 Days |
| AF | 27 | 19 | 19 | 22 | 21 |
| Ref AM | 19.5 | 13 | 12 | 16 | 14 |
| Ref A | 14 | 14 | 14 | 18 | 16 |

TABLE V

| | Percent Sulfur Conversion | | | | |
|---|---|---|---|---|---|
| Catalysts | 5 Days | 10 Days | 13 Days | 15 Days | 18 Days |
| AF | 68 | 53 | 51 | 60 | 57 |
| Ref AM | 51.5 | 43 | 41 | 48 | 46.5 |
| Ref A | 59 | 54 | 51 | 60 | 57 |

In view of the data in Table IV relative to nitrogen conversion of the feedstock, catalyst AF of the invention is noticeably more active than reference catalysts A and AM, during the entire run.

In view of the data in Table V relative to sulfur conversion of the feedstock catalyst AF of the invention is more active than reference catalyst AM and essentially as active as catalyst A during the run.

In contrast to a comparable catalyst, devoid of a non-hydrolyzable halogen component, the catalyst of the invention proves more effective for hydrodenitrogenating a heavy hydrocarbon oil.

While particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A method for hydroprocessing a hydrocarbon oil, said method comprising contacting a hydrocarbon oil containing asphaltenes under hydroprocessing conditions with a particulate catalyst to convert at least a portion of said asphaltenes in said hydrocarbon oil so as to produce a product oil of reduced asphaltene content, said particulate catalyst comprising at least one active hydrogenation metal component on a support material comprising a zeolite or molecular sieve containing at least one non-hydrolyzable halogen component.

2. The method defined in claim 1 wherein said hydrocarbon oil comprises a residuum feedstock containing at least about 1.0 weight percent of said asphaltenes and said halogen component comprises fluorine.

3. The method defined in claim 1 wherein said method further comprises hydrodesulfurization.

4. The method defined in claim 1 wherein said hydroprocessing method further comprises denitrogenation.

5. The method defined in claim 1 wherein said hydroprocessing method further comprises demetallization.

6. The method defined in claim 1 wherein said hydroprocessing comprises the conversion of asphaltenes at a temperature in the range from about 600° F. to about 850° F. and a hydrogen pressure from about 1,000 p.s.i.g. to about 2,500 p.s.i.g.

7. The method defined in claim 1 wherein said halogen component comprises fluorine.

8. The method defined in claim 1 wherein said active metal component comprises a Group VIB metal.

9. The method defined in claim 1 wherein said support material comprises a zeolite selected from the group consisting of erionite, mordenite, zeolite Y, zeolite X, zeolite omega, zeolite beta, zeolite ZSM-5, zeolite ZSM-11, zeolite ZSM-12, zeolite ZSM-35, and zeolite L.

10. The method defined in claim 1 wherein said particulate catalyst is prepared by a method comprising the steps of:
(1) contacting an elemental halogen-containing gas with a zeolite or molecular sieve; and
(2) compounding the halogen-containing zeolite or molecular sieve obtained from step (1) with one or more precursors of at least one catalytically active hydrogenation metal component and then activating said composition.

11. A method for hydrodesulfurizing a residuum hydrocarbon oil containing sulfur components, nitrogen components and at least about 1.0 weight percent of asphaltenes by contacting the oil under reaction conditions including a temperature in the range from about 600° F. to about 850° F. and a hydrogen pressure from about 1,000 p.s.i.g. to about 2,500 p.s.i.g. with a particulate catalyst to convert at least a portion of said asphaltenes in said residuum hydrocarbon oil so as to produce a product oil of reduced asphaltene content, said particulate catalyst comprising at least one active hydrogenation metal component on a support comprising a zeolite containing at least one non-hydrolyzable halogen component.

12. The method defined in claim 11 wherein the nitrogen content of said residuum hydrocarbon oil is reduced and said halogen component comprises fluorine.

13. The method defined in claim 11 wherein said active metal component comprises molybdenum and said zeolite comprises zeolite Y containing fluorine.

14. The method defined in claim 11 wherein at least about 5 weight percent of the constituents of said residuum hydrocarbon oil boil above about 1000° F.

15. A method for denitrogenating a hydrocarbon oil containing nitrogen components and asphaltenes by contacting the oil with a particulate cataylst under denitrogenation conditions and converting at least a portion of said nitrogen components and said asphaltenes in said hydrocarbon oil to produce a product oil of reduced nitrogen and asphaltene content, said particulate catalyst having a support comprising a zeolite containing at least one non-hydrolyzable fluorine component.

16. The method defined in claim 15 wherein said hydrocarbon oil contains about 0.2 to about 1.0 weight percent of said nitrogen, calculated as N.

17. The method defined in claim 15 wherein said hydrocarbon oil contains at least 1.0 weight percent of said asphaltenes.

18. The method defined in claim 15 wherein said hydrocarbon oil further contains sulfur.

19. The method defined in claim 11 wherein said catalyst further comprises at least one active metal component.

20. The method defined in claim 19 wherein said active metal comprises molybdenum.

* * * * *

UNITED STATES PATENT AND TRADEMARK OFFICE
CERTIFICATE OF CORRECTION

PATENT NO. : 4,844,791

DATED : July 4, 1989

INVENTOR(S) : Eric L. Moorehead

It is certified that error appears in the above-identified patent and that said Letters Patent is hereby corrected as shown below:

Claim 19, column 15, line 6, "11" should read --15--.

Signed and Sealed this

Twenty-second Day of January, 1991

Attest:

HARRY F. MANBECK, JR.

*Attesting Officer*  *Commissioner of Patents and Trademarks*